US008299170B2

(12) United States Patent
Templeman et al.

(10) Patent No.: US 8,299,170 B2
(45) Date of Patent: Oct. 30, 2012

(54) SELF-STRATIFYING COATING

(75) Inventors: Cynthia G. Templeman, Ypsilanti, MI (US); Jamil Baghdachi, Northville, MI (US); Punthip Talapatcharoenkit, Ypsilanti, MI (US)

(73) Assignees: Toyota Motor Engineering & Manufacturing North America, Inc., Erlanger, KY (US); Eastern Michigan University, Ypsilanti, MI (US)

( * ) Notice: Subject to any disclaimer, the term of this patent is extended or adjusted under 35 U.S.C. 154(b) by 7 days.

(21) Appl. No.: 12/899,345

(22) Filed: Oct. 6, 2010

(65) Prior Publication Data
US 2011/0028612 A1 Feb. 3, 2011

Related U.S. Application Data

(63) Continuation-in-part of application No. 12/247,226, filed on Oct. 8, 2008, now Pat. No. 7,863,375.

(51) Int. Cl.
*C08K 5/16* (2006.01)
*C08K 5/5419* (2006.01)

(52) U.S. Cl. ........ 524/755; 524/114; 524/588; 524/589; 524/590; 524/728

(58) Field of Classification Search .......... 524/114, 524/426, 795, 755, 588, 589, 590, 728; 528/70
See application file for complete search history.

(56) References Cited

U.S. PATENT DOCUMENTS

| | | | | |
|---|---|---|---|---|
| 4,841,007 A * | 6/1989 | Zdrahala et al. | ......... | 528/28 |
| 4,960,828 A * | 10/1990 | Higuchi et al. | ......... | 525/162 |
| 5,230,962 A * | 7/1993 | Stephenson | ......... | 428/423.1 |
| 5,674,951 A * | 10/1997 | Hargis et al. | ......... | 525/410 |
| 6,001,923 A * | 12/1999 | Moncur et al. | ......... | 524/590 |
| 6,683,151 B1 | 1/2004 | Loontjens et al. | | |
| 7,030,058 B1 | 4/2006 | Nakabayashi | | |
| 7,186,772 B2 | 3/2007 | Berkau et al. | | |
| 7,211,543 B2 | 5/2007 | Nakabayashi et al. | | |
| 7,863,375 B2 * | 1/2011 | Baghdachi et al. | ......... | 524/714 |
| 8,044,140 B2 * | 10/2011 | Baghdachi et al. | ......... | 524/714 |
| 2003/0191207 A1 | 10/2003 | Dejima et al. | | |
| 2004/0011657 A1 | 1/2004 | Muramoto et al. | | |
| 2005/0010011 A1 * | 1/2005 | Spyrou et al. | ......... | 528/28 |
| 2005/0123770 A1 | 6/2005 | Kawazu et al. | | |
| 2006/0058436 A1 * | 3/2006 | Kasler | ......... | 524/261 |
| 2006/0147639 A1 | 7/2006 | Tsujioka et al. | | |
| 2010/0087596 A1 * | 4/2010 | Baghdachi et al. | ......... | 524/728 |
| 2010/0317787 A1 * | 12/2010 | Baghdachi et al. | ......... | 524/441 |

(Continued)

OTHER PUBLICATIONS

"Aquaderm Matting" Data sheet. Obtained from SciFinder on May 18, 2012. No Author, No Date.*

(Continued)

*Primary Examiner* — Liam Heincer
*Assistant Examiner* — Michael A Salvitti
(74) *Attorney, Agent, or Firm* — Gifford, Krass, Sprinkle, Anderson & Citkowski, P.C.

(57) ABSTRACT

The present invention discloses a reactivity-based self-stratifying coating composition. The coating composition can include a polyol, silsesquioxane, a polyester polyol, and a crosslinker that form a mixture within a solvent. The polyol can be selected from a fluorinated polyether, a fluoroethylene-alkyl vinyl ether and/or a combination thereof. The silsesquioxane can be an epoxy functional silsesquioxane having a formula of $(R)_6(C_6H_{11}O_2)_2(SiO_{1.5})_8$ where R can be selected from hydrogen, methyl, ethyl, propyl, butyl, pentyl, hexyl, cyclopentyl, cyclohexyl, benzyl, phenyl, and isomers thereof. In some instances, the epoxy functional silsesquioxane can be a di-epoxy silsesquioxane.

8 Claims, 2 Drawing Sheets

U.S. PATENT DOCUMENTS

2011/0028612 A1* 2/2011 Templeman et al. ......... 524/114

OTHER PUBLICATIONS

"Bayderm Finish" Data sheet. Obtained from SciFinder on May 18, 2012. No Author, No Date.*

V. V. Verkholantsev, Self-Stratifying coatings for industrial applications, Pigment and Resin Technology, 2003.
P. Vink and T. L. Bots, Formulation parameters influencing self-stratification of coatings, Progress in Organic Coatings, 1996.
A. Toussaint, Self-stratifying coatings for plastic substrates, Progress in Organic Coatings, 1996.

* cited by examiner

SELF-STRATIFYING COATING

RELATED APPLICATION

This application is a continuation-in-part to and claims priority of U.S. patent application Ser. No. 12/247,226, titled "Self-Stratifying Automotive Topcoat Compositions and Processes" and filed on Oct. 8, 2008, which is incorporated herein in its entirety by reference.

FIELD OF THE INVENTION

The present invention relates to self-stratifying coating compositions and, more specifically, to reactivity-based self-stratifying coating compositions.

BACKGROUND OF THE INVENTION

Coatings for motor vehicles, airplanes, rail-mounted vehicles and the like typically combine functions of decoration and protection. As such, the development of coatings having desired properties with respect to corrosion protection, scratch resistance, optics, coloring, chemical attack and resistance to a variety of other possible environmental effects is known. In addition, coatings can include multiple layers. For example, the "paint" on a motor vehicle can include a topcoat that has a base layer and a separately applied clearcoat on top of the base layer. The base layer is typically employed for color while the clearcoat provides protection of coating pigments in the base layer, scratch/mark resistance, gloss and/or depth of field.

The application of a coating having multiple separate layers can be costly and present technical challenges such as prolonged application time, increased equipment needs and the like. Therefore, a coating formulation that self-stratifies into, for example, a base layer and a top layer could streamline a coating process, reduce manufacturing costs, etc., and thus would be desirable.

SUMMARY OF THE INVENTION

The present invention discloses a reactivity-based self-stratifying coating composition. The coating composition can include a polyol, silsesquioxane, a polyester polyol, and a crosslinker that form a mixture within a solvent. The polyol can be selected from a fluorinated polyether, a fluoroethylene-alkyl vinyl ether and/or a combination thereof. The silsesquioxane can be an epoxy functional silsesquioxane having a formula of $(R)_6(C_6H_{11}O_2)_2(SiO_{1.5})_8$ where R can be selected from hydrogen, methyl, ethyl, propyl, butyl, pentyl, hexyl, cyclopentyl, cyclohexyl, benzyl, phenyl, and isomers thereof. In some instances, the epoxy functional silsesquioxane can be a di-epoxy silsesquioxane.

The polyester polyol can have an aliphatic structure with pendant hydroxyl groups. For example, the polyester can be a linear hydroxyl with terminal ends and have a hydroxyl value between 100 and 500, a viscosity between 1,000 and 50,000 centipoise (cPs) and/or an average molecular weight of between 100 and 2,500.

DETAILED DESCRIPTION OF THE PRESENT INVENTION

Figure 1:
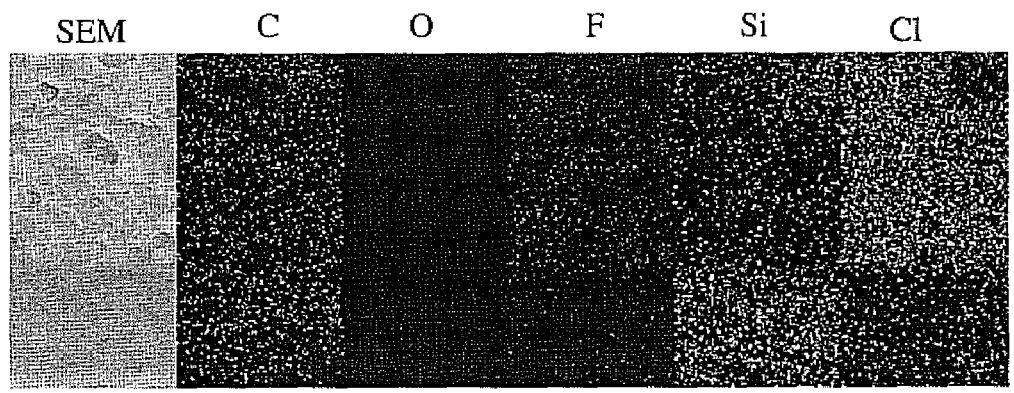
FIG. 1 is a scanning electron microscopy (SEM) and energy dispersive x-ray (EDX) analysis of a coating composition illustrating self-stratification according to an embodiment of the present invention.

The present disclosure includes embodiments, implementations and/or aspects that relate to a coating composition, processes of use and preparing thereof. As one general example of a coating composition, the composition can include a coating with multiple layers such as a clearcoat, a basecoat primer surfacer, an electrocoat, zinc phosphate and a substrate. Further, an inventive coating can include a clearcoat having a thickness of approximately 15-150 microns, a basecoat of approximately 10-50 microns, primer surfacer having a thickness of approximately 10-150 microns, an electrocoat having a thickness of approximately 25 microns, zinc phosphate having a thickness of approximately 1-4 microns and a substrate made from steel or the like.

The present disclosure also describes compositions and processes that enable the self-layering or self-stratifying of a coating and can be applicable to solvent-based, waterborne and powder coatings which may require specific formulations and conditions of application and film formation.

The self-stratifying coating compositions can allow formulation of solvent-based composite systems based on blends of thermosetting polymers to produce micro-heterogeneous polymer/crosslinked polymer composites that separate into a predominately double-layer coating structure. A selective chemical reaction can occur between and among components of the coating composition as a function of time and/or temperature. In some instances, the components can include a polyol, a silsesquioxane, a polyester polyol, and a crosslinker. While in liquid form, the components can form a homogeneous solution and may not be crosslinked. Also, preferential migration of certain components can occur upon curing and thereby afford a stratified coating.

The formation of an inventive self-stratifying coating can be reactivity-based and not be primarily a function of the different component surface tensions, viscosities, etc. Stated differently, the reaction between two or more of the composition components can afford for the system to separate into at least two distinctive layers upon curing. In addition, formation of at least two layers within the coating may or may not be the result of either mutual or partial incompatibility of the composite resins.

In some instances, the stratification of a homogeneous one-phase coating into two layers can be afforded by removal, such as by evaporation, of the solvents which keeps the system of otherwise incompatible components in thermodynamic equilibrium. In other instances, preferred and time/temperature selective crosslinking reactions among polymer units can result in molecular growth with an equilibrium shift of the system separating the composition into two distinct layers. It is understood that crosslinking reactions as discussed herein may follow conventional reactions between primary and secondary hydroxyl groups with isocyanate groups.

Aspects of the coating compositions disclosed herein for automotive purposes can include crosslinking compositions which, upon curing, produce a stratified clear coating. For example and for illustrative purposes only, a self-layering or self-stratifying coating can be provided by contacting components including, but not limited to, a polyol, a silsesquioxane, a polyester polyol, and a crosslinker emulsified or dispersed in a solvent. In certain aspects of the present disclosure, the polyol can be selected from a fluorinated polyol, such as a fluorinated polyether or a fluoroethylene-alkyl vinyl ether or the like. In addition, the silsesquioxane can contain an epoxy functional group and the polyester polyol can contain a hydroxyl functional group. It is understood that contacting the aforementioned components can also refer to the combining, blending, mixing or reacting of the components to produce the resultant coating composition.

Any suitable solvent including a variety of solvents typically used in coatings may be utilized to dissolve the polyol, silsesquioxane, polyurethane dendrimers and crosslinkers. In certain aspects of the disclosure, tetrahydrofuran (THF) and/or dimethylacetamide (DMA) may be used as the solvent(s) in which the components are emulsified or dispersed.

In an example of a coating composition, the solvent-emulsified and/or dispersed components can be dried to afford a solid film by applying the mixture onto a substrate followed by the application of external heat. Any suitable external heat treatment may be applied to the wet film in the range of approximately 25-125° C. for 30 minutes followed by a further heat treatment at 125-160° C. for another 30 minutes to form a crosslinked film.

As used herein, the term "polyol" is also applicable to "diol". For example, a polyether polyol is a polyol possessing a polyoxyalkylene structure composed of a polyoxyalkylene group having 2 to 10 carbon atoms and an oxygen atom as a repetitive unit. The polyol compound of the present disclosure may include a polyhydric alcohol having 2 to 12 carbon atoms, specific examples thereof may include fluorinated polyether and the like. The polyol compounds may include both low and high molecular weight polyols having weight average molecular weight in the range of approximately 2000-10,000 Dalton. Commercially available polyols may include fluorinated polyether (as Polyfox 656, Polyfox 6520 from Omnova Solutions Inc.) and a hydroxyl functional fluoro ethylene alkyl vinyl ether (as Lumiflon 200 (LF 200) and Lumiflon 910 (LF 910) from Asahi Glass Co., Japan and Asahi Glass America Inc., respectively). The polyol components of the present disclosure may be used individually or in combination of two or more thereof.

In some instances, and for illustration purposes only, a representative chemical structure of a polyol such as hydroxyl functional fluoroethylene-alkyl vinyl ether is illustrated by Structure A shown below. In the present structure, R can represent any alkyl or group including, but not limited to, methyl, ethyl, propyl, butyl, pentyl, hexyl, cyclopentyl, cyclohexyl, benzyl or phenyl groups and the like, including all their isomers, for example, tertiary butyl, isopropyl, and the like.

Structure A

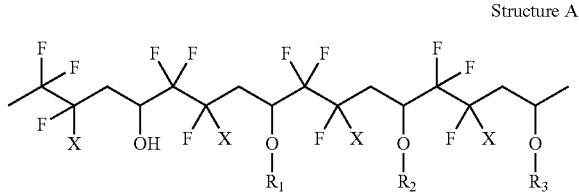

An exemplary epoxy functional silsesquioxane hybrid organic/inorganic oligomeric reactant can be prepared by contacting methyltrimethoxysilane with glycidoxypropyltrimethoxysilane in the presence of catalytic amounts of formic acid and water. Silsesquioxane can have the formula $(R)_6(C_6H_{11}O_2)_2(SiO_{1.5})_8$ wherein R can represent any alkyl or aryl group including, but not limited to, hydrogen, methyl, ethyl, propyl, butyl, pentyl, hexyl, cyclopentyl, cyclohexyl, benzyl or phenyl groups and the like, including all their isomers, for example, tertiary butyl, isopropyl, and the like. For the purpose of illustration only, a representative chemical structure of an epoxy functional silsesquioxane such as diepoxy silsesquioxane, is illustrated by Structure B shown below.

Structure B

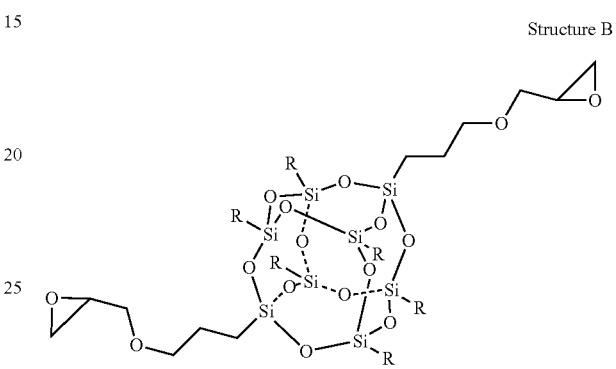

Regarding a polyester polyol, a representative chemical structure of an exemplary aliphatic polyester polyol, such as a terephthalic acid-diethylene glycol (TPA-DEG) polyester polyol is illustrated by Structure C shown below for illustrative purposes only.

Structure C

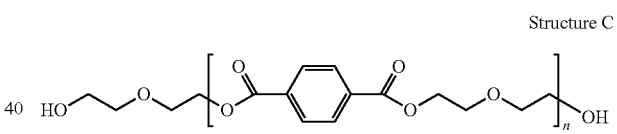

The polyester polyols of the present disclosure can be produced by following any conventional reaction procedure of producing such polyols. For example and for illustrative purposes only, reacting terephthalic acid (TPA) with glycols such as diethylene glycol (DEG) at temperatures above 220° C. can provide oligomers as shown in Structure C above. However, such a reaction can produce polyester polyol having a wide range of molecular weights. In the alternative, reaction of C4-C8 straight chain dicarboxylic acids with bis (hydroxymethyl)cyclohexane can provide a condensation product of low molecular weight polyester polyols such linear, aliphatic structures with pendant hydroxyl groups.

In some instances, the polyester polyol has a hydroxyl value between 100 and 500, a viscosity between 1,000 and 50,000 cPs and an average molecular weight of between 100 and 2,500. In other instances, the polyester polyol has a hydroxyl value between 150 and 400, a viscosity between 5,000 and 25,000 cPs and an average molecular weight of between 200 and 1,000. In still other instances, the polyester polyol has a hydroxyl value between 200 and 300, a viscosity between 7,500 and 15,000 cPs and an average molecular weight of between 200 and 750. For example and for illustrative purposes only, K-FLEX® A-307 as provided by King Industries located in Norwalk, Conn., USA can be used as the polyester polyol.

Regarding the crosslinker component, which can react with both the aforementioned polyol and the polyester polyol, a representative general chemical structure of a crosslinker, such as a hexamethylene diisocyanate (HDI) crosslinker, is shown below as Structure D. Possible crosslinkers may include, but are not limited to HDI, hexamethylene triisocyanate (HTI), methylene bis-(4-cyclohexyl isocyanate) (HMDI) and a combination thereof.

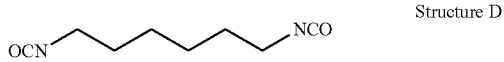

Structure D

The reaction of hydroxyl compounds with isocyanate compounds is generally known. The current disclosure employs hydroxyl compounds that have different reactivity towards crosslinkers such as di- and triisocyanates. Examples of the before-mentioned isocyanate compounds may include polyfunctional isocyanate compounds such as diisocyanate and triisocyanates, for example, isophorone diisocyanate (IPDI), isophorone triisocyanate (IPTI), hexane diisocyanate and the like. In general, catalysts used in such reactions may include metal-organic compounds such as tin and titanium reaction products and certain tertiary amine compounds. Examples of catalysts may include 1,4-diazabicyclo[2.2.2]octane (DABCO), triethylamine and the like. The amount of catalysts utilized varies based on the reactants, formulation variables, types of both crosslinker and polyols as well as desired cure speed. The preferred amounts range from 0.01-5% by weight based on the total resin solids of the formulated product.

The coating composition can be applied immediately on a substrate after it is produced by contacting a fluorinated polyol, a functionalized silsesquioxane, polyester polyol, a solvent and any catalyst or additives, if necessary. The self-stratifying coating can be applied by a wide variety of techniques including brushing, roll coatings, spray, drawdown methods and the like. In general, the stratification is not to be affected by the application method, however this is not required. While any film thickness in the range of approximately 0.1-10 mils or 2.5-250 microns can result in a stratified coating, in one embodiment, the film thickness may be in the range of 25-75 microns.

The coating composition of the present disclosure may be used for a variety of substrates, for example, plastics, metals (e.g., aluminum), glass and their molded products. More particularly, it may be used for automotive exterior and interior parts such as the body and doors, interior panels and consoles and the like.

The following examples are set forth for the purpose of explanation, and not limitation, to provide a thorough understanding of the present disclosure, including representative advantages thereof.

Example 1

Formulation and application (Lumiflon 200, K-FLEX A-307, Di-epoxy silsesquioxane, Desmodur N75BA): 1.53 g of di-epoxy silsesquioxane solution in THF and 0.81 g of 97% solids K-Flex A-307 were weighed in a vial and stirred to produce a clear solution. 1.29 g hexane diisocyanate (HDI) (75% Desmodur N75), 3.00 g Lumiflon 200 and 1.29 g N,N-dimethylacetamide (DMA) were weighed and added to the same vial. The mixture was stirred until a homogenous mixture was obtained. A portion of the mixture was applied by pipette to a clean aluminum substrate to obtain a coating film by a drawdown box with a wet film thickness of 8 mils (200 microns).

Flash off and curing conditions: The mixture was flashed off at room temperature for 30 minutes. Some coating processes and applications require a flash off stage in which the coating is allowed to stand either at room temperature or at slightly elevated temperatures for a short period of time before baking at elevated temperatures. The flash-off times may vary depending on formulation and may be based on variables such as film thickness, ambient or oven temperatures, air current velocity, and diluents or solvents used in the coating. In general a flash-off time in the range of approximately 2-15 minutes at ambient temperature may be applied to prepare coatings for further heat application. The film was then cured at 100° C. for 30 minutes. Subsequently, the film was cured at 120° C. for 30 minutes. In a typical application of an automotive coating, a basecoat is applied and allowed to flash off for approximately 5-10 minutes before the application of a clearcoat. The composite coating is then flashed off for another 5-10 minutes before entering into a bake oven.

Test sample preparation: Samples were prepared for analysis by Scanning Electron Microscopy (SEM) and Energy Dispersive X-Ray (EDX). A steel panel was cut to obtain a slide approximately 2 cm in width. A homogeneous coating mixture was processed to afford stratified coatings on standard steel panels measuring 3 inches by 6 inches. To prepare panels for SEM and EDX analysis, the panels were cut into about 2 cm by 1 centimeter portions to produced slides. The coating slides were maintained at liquid nitrogen temperature measuring in the range of approximately −199 to −150° C. The slide was then inserted into liquid nitrogen and removed. The previous steps were repeated approximately 20 times until the slide reached a very cold temperature, such as approximately −175° C. The slide was bent to break the film into multiple pieces to result in cross-sectional surfaces. The samples or pieces of film were then transferred to a SEM stage stub with the cross-sectional surfaces facing upward. The stage stub with samples of film were placed in a chamber of sputter device, the Denton Vacuum DeskIV in the present procedure, and the samples were sputtered with gold particles to produce conductive samples.

SEM and EDX Analysis: Scanning Electron Microscopy (SEM) instrumentation, the Hitachi SEM model S3400N with EDX spectrometer in the present procedure, was utilized to verify the stratified layers of the samples of film, as shown in FIG. 1. Through such analysis, a cross-section containing two layers was viewed. EDX analysis was then conducted to insure the elemental composites such as fluorine (F), silicon (Si), oxygen (O) and chlorine (Cl) of each layer. As shown in FIG. 1, stratification was achieved with Si segregated to the bottom phase and Cl and F segregated to the top phase.

Example 2

Formulation and application (Lumiflon 200, dendrimer, DMS E-11, Desmodur N75BA): 0.3 g of DMS E-11 and 3.1 g of dendrimer were weighed in a vial and stirred to produce a clear solution. 1.29 g hexane diisocyanate (HDI) (75% Desmodur N75), 3.00 g Lumiflon 200 and 1.29 g N,N-dimethylacetamide (DMA) were weighed and added to the same vial. The mixture was stirred until a homogenous mixture was obtained. A portion of the mixture was applied by pipette to a clean aluminum substrate to obtain a coating film by a drawdown box with a wet film thickness of 8 mils (200 microns).

Flash off and curing conditions, as well as test sample preparation, were the same as for Example 1.

Figure 2:
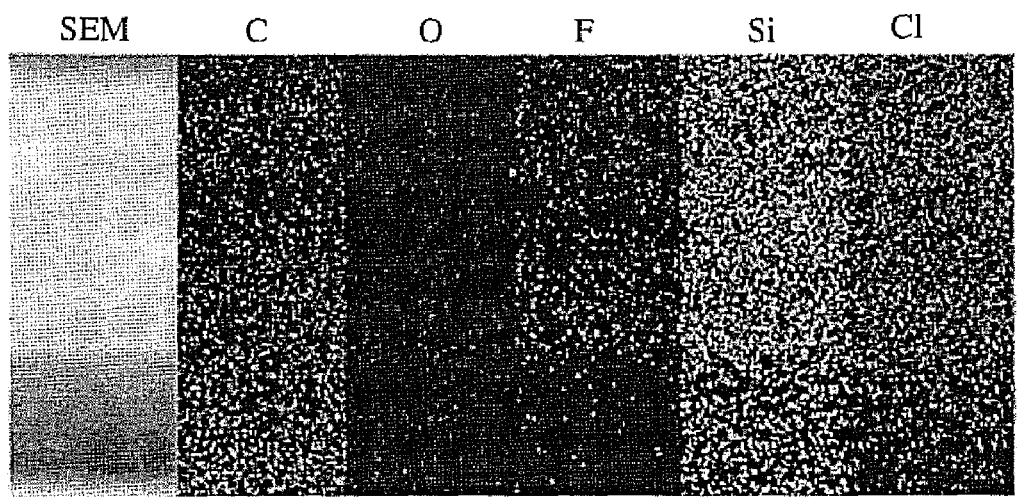
FIG. 2 is an SEM and EDX analysis illustrating a coating composition possessing pseudo-self-stratification according to an embodiment of the present invention.

SEM and EDX Analysis: As shown in FIG. 2, stratification appears to be present but not as distinct as for the coating composition in Example 1. Likewise, the segregation of Si is not as distinct as in Example 1, and in fact, the Si segregated mostly to the top phase for this composition, as did the Cl and F.

Example 3

Formulation and application (HomologueLF, K-FLEX A-307, Di-epoxy silsesquioxane, Desmodur N75BA): 2.4 g of Lumiflon homologue LF 0902, 0.32 g of K-Flex A-307 were weighed in a vial and stirred to produce a clear solution. 0.516 g hexane diisocyanate (HDI) (75% Desmodur N75), 0.612 g of di-epoxy silsesquioxane solution in THF and 1.29 g N, N-dimethylacetamide (DMA) were weighed and added to the same vial. The mixture was stirred until a homogenous mixture was obtained. A portion of the mixture was applied by pipette to a clean aluminum substrate to obtain a coating film by a drawdown box with a wet film thickness of 8 mils (200 microns).

Flash off and curing conditions, as well as test sample preparation, were the same as for Example 1.

Figure 3:
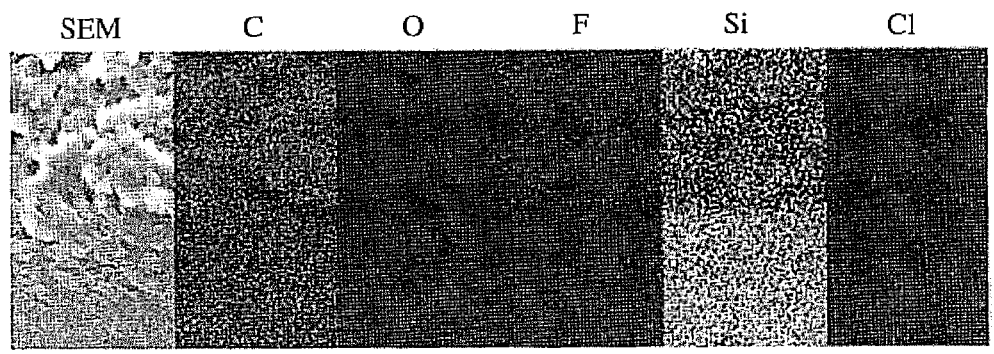
FIG. 3 is an SEM and EDX analysis of a coating composition possessing self-stratification according to an embodiment of the present invention.

SEM and EDX Analysis: As shown in FIG. 3, stratification is present and Si segregation to the bottom phase clearly present.

Example 4

Formulation and application (HomologueLF, K-FLEX A-307, DMS E-11, Desmodur N75BA): 2.4 g of Lumiflon homologue LF 0902, 0.32 g of K-Flex A-307 were weighed in a vial and stirred to produce a clear solution. 0.516 g hexane diisocyanate (HDI) (75% Desmodur N75), 0.3 g 100% solids DMS E-11 and 1.29 g N,N-dimethylacetamide (DMA) were weighed and added to the same vial. The mixture was stirred until a homogenous mixture was obtained. A portion of the mixture was applied by pipette to a clean aluminum substrate to obtain a coating film by a drawdown box with a wet film thickness of 8 mils (200 microns).

Flash off and curing conditions, as well as test sample preparation were the same as for Example 1.

Figure 4:
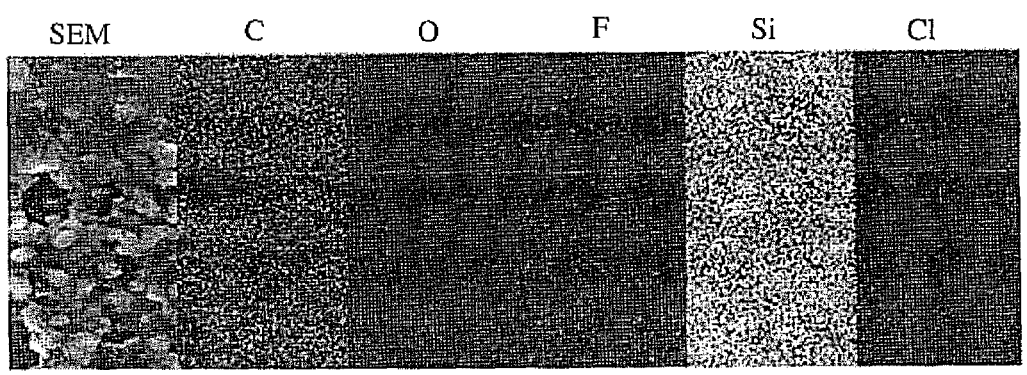
FIG. 4 is an SEM and EDX analysis illustrating a coating composition that does not possess self-stratification.

SEM and EDX Analysis: As shown in FIG. 4, stratification was not achieved and there was no Si segregation.

From the examples above, it is clear that reactivity-based compositions containing a polyol, silsesquioxane, polyester polyol and crosslinker afford for self-stratifying coatings. As such, processes and compositions discussed herein can provide a streamlined process of manufacturing a coating in which the number of separately applied layers are reduced, such as by combining at least one multifunctional layer (e.g., basecoat, clearcoat) into one single applied layer. Further, the coating composition provided herein can preserve the attributes and characteristics found in typical coatings such as durability, ultraviolet (UV) light screening, high gloss and overall simplified application.

In view of the teaching presented herein, it is to be understood that numerous modifications and variations of the present invention will be readily apparent to those of skill in the art. The foregoing is illustrative of specific embodiments of the invention, but is not meant to be a limitation upon the practice thereof. It is the following claims, including all equivalents, which define the scope of the invention.

We claim:

1. A reactivity-based self-stratifying coating comprising:
a self-stratified coating containing silicon, having two distinct layers and containing a polyol other than a polyester polyol, a silsesquioxane, a polyester polyol and a crosslinker;
wherein the polyol other than a polyester polyol, silsesquioxane and polyester polyol are crosslinked and the silicon is segregated to one of the two distinct layers, and the silsesquioxane is an epoxy functional silsesquioxane having a formula $(R)_6(C_6H_{11}O_2)_2(SiO_{1.5})_8$ and R is selected from the group consisting of hydrogen, methyl, ethyl, propyl, butyl, pentyl, hexyl, cyclopentyl, cyclohexyl, benzyl, phenyl and isomers thereof.

2. The coating of claim 1, wherein the polyol other than a polyester polyol contains fluorine and is selected from the group consisting of a fluorinated polyether, a fluoroethylene-alkyl vinyl ether and a combination thereof, and the fluorine is segregated to one of the two distinct layers.

3. The coating of claim 1, wherein the epoxy functional silsesquioxane is a di-epoxy silsesquioxane.

4. The coating of claim 1, wherein the polyester polyol has an aliphatic structure with pendant hydroxyl groups.

5. The coating of claim 1, wherein the polyester polyol has an average molecular weight of between 100 and 2,500 Dalton.

6. The coating of claim 5, wherein the average molecular weight of the polyester polyol is between 200 and 1,000 Dalton.

7. The coating of claim 5, wherein the average molecular weight of the polyester polyol is between 200 and 750 Dalton.

8. The coating of claim 1, wherein the crosslinker is an isocyanate-functional compound selected from the group consisting of hexamethylene diisocyanate (HDI), hexamethylene triisocyanate (HTI), methylene bis-(4-cyclohexyl isocyanate) (HMDI) and a combination thereof.

* * * * *